(12) United States Patent
Lin

(10) Patent No.: US 10,342,329 B2
(45) Date of Patent: Jul. 9, 2019

(54) MULTIMEDIA OPERATION SYSTEM WITH CONTROL PANEL

(71) Applicant: BENQ CORPORATION, Taipei (TW)

(72) Inventor: Hsin-Nan Lin, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 15/632,409

(22) Filed: Jun. 26, 2017

(65) Prior Publication Data

US 2017/0367477 A1 Dec. 28, 2017

(30) Foreign Application Priority Data

Jun. 27, 2016 (TW) .............................. 105120173 A

(51) Int. Cl.
*G06F 3/01* (2006.01)
*A47B 21/00* (2006.01)
*G06F 1/16* (2006.01)
*G06F 3/0488* (2013.01)

(52) U.S. Cl.
CPC ................ *A47B 21/00* (2013.01); *G06F 1/16* (2013.01); *A47B 2200/0073* (2013.01); *A63F 2300/10* (2013.01); *G06F 3/04883* (2013.01)

(58) Field of Classification Search
None
See application file for complete search history.

(56) References Cited

U.S. PATENT DOCUMENTS

| 9,693,015 B2 * | 6/2017 | McArdell | H04N 7/142 |
| 2005/0156933 A1 * | 7/2005 | Lee | G09G 5/006 |
| | | | 345/520 |
| 2011/0075337 A1 * | 3/2011 | Riley | A47B 21/0073 |
| | | | 361/679.2 |
| 2011/0224811 A1 * | 9/2011 | Lauwers | G06F 3/16 |
| | | | 700/94 |
| 2012/0141087 A1 | 6/2012 | Carlsgaard | |
| 2017/0148197 A1 * | 5/2017 | Winternitz | G06T 11/206 |
| 2017/0187658 A1 * | 6/2017 | Ryu | G06F 3/14 |

FOREIGN PATENT DOCUMENTS

| CN | 101753903 A | 6/2010 |
| TW | 200529666 | 9/2005 |
| TW | 200933440 | 8/2009 |

* cited by examiner

*Primary Examiner* — Joseph R Haley

(57) ABSTRACT

A multimedia operation system includes a display, a display driver, a desk, a display control panel, an input/output interface driver, and an application processor. The display driver drives the display to display images. The display control panel is disposed in the desk, and outputs an initiation signal according to a user's operation. The input/output interface driver receives the initiation signal and outputs a menu activation signal according to the initiation signal. The application processor executes an application to generate multimedia data, controls the display driver to drive the display for displaying application images of the multimedia data, and controls the display driver to drive the display for displaying a menu image when receiving the menu activation signal.

19 Claims, 3 Drawing Sheets

US 10,342,329 B2

MULTIMEDIA OPERATION SYSTEM WITH CONTROL PANEL

BACKGROUND OF THE INVENTION

1. Field of the Invention

This invention relates to a multimedia operation system, especially relates to a multimedia operation system capable of being controlled by a control panel installed on a desk.

2. Description of the Prior Art

As technology advances, computers have become an important part of human life. The computers can work with other output devices, such as display monitors, and speakers, to build up a multimedia operation system, which has become the main entertainment sources for many people. For example, watching movie to experience the vivid images and sound effects with the multimedia operation system, or playing video games to involve in a virtual world with multimedia operation system are both common entertainment options for modern people.

In prior art, before operating the multimedia operation system, the user may use the input device, such as the mouse, the keyboard or the joy stick, to control the multimedia operation system, or the user may operate the buttons on the output devices directly to adjust the characteristics of the output device, such as brightness, volume, etc. However, in this case, the interactions between the user and the multimedia operation system are usually interrupted by the control operations, causing inconvenience, especially when the user is playing video game, delicate operations on the joy stick or the keyboard are usually required. If the users are distracted to find the control buttons on the output devices to make adjustment, then the users may miss the timing to make proper responses and lose the game.

Therefore, how to improve the multimedia operation system so that the user can operate the multimedia operation system more smoothly has become an issue to be solved.

SUMMARY OF THE INVENTION

One embodiment of the present invention discloses a multimedia operation system. The multimedia operation system includes a desk, a display, a display driver, a display control panel, an input/output interface driver, and an application processor.

The display is disposed on the desk. The display driver is coupled to the display. The display driver drives the display to display images. The display control panel is installed on the desk, and the display control panel includes a plurality of buttons. The display control panel outputs an initiation signal according to a user's operation. The input/output interface driver includes a plurality of input/output ports coupled to the display control panel. The input/output interface driver receives the initiation signal and outputs a menu activation signal according to the initiation signal. The application processor is coupled to the input/output interface driver and the display driver. The application processor executes an application to generate multimedia data, controls the display driver to drive the display for displaying an application image of the multimedia data, and controls the display driver to drive the display for displaying a menu image when receiving the menu activation signal.

Another embodiment of the present invention discloses a multimedia operation system. The multimedia operation system includes a desk, a display, a display driver, a display control panel, an input/output interface driver, and an application processor.

The display is disposed on the desk, and the display displays a menu image or an application image of multimedia data. The display driver is coupled to the display through a transmission line. The display control panel is installed on the desk, and includes a plurality of buttons. The display control panel outputs a first control signal to select a specific option in the menu image according to a user's operation when the display displays the menu image.

The input/output interface driver includes a plurality of input/output ports coupled to the display control panel. The input/output interface driver receives the first control signal and outputs a menu control signal according to the first control signal. The application processor is coupled to the input/output interface driver. The application processor executes an application to generate the multimedia data, and outputs a display control signal to the display driver to have the display driver adjust a display characteristic of the display corresponding to the specific option according to the menu control signal.

The display driver outputs control instructions through a display data channel command interface (DDC/CI) of the transmission line to the display to adjust the display characteristic of the display corresponding to the specific option according to the display control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
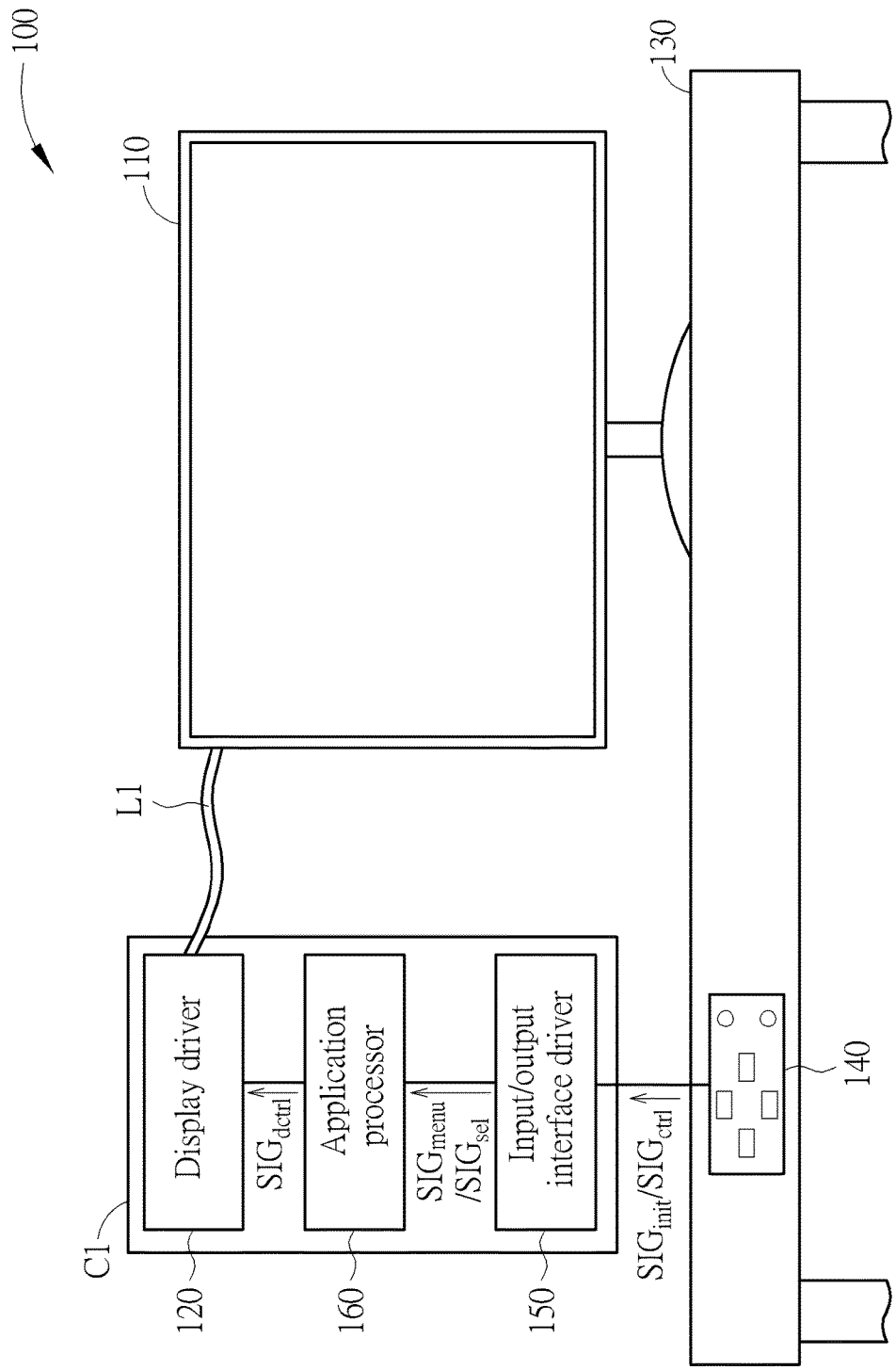
FIG. 1 shows a multimedia operation system according to one embodiment of the present invention.

FIG. 1 shows a multimedia operation system 100 according to one embodiment of the present invention. The multimedia operation system 100 includes a display 110, a display driver 120, a desk 130, a display control panel 140, an input/output interface driver 150, and an application processor 160. The application processor 160 is coupled to the display driver 120 and the input/output interface driver 150, and the input/output interface driver 150 is further coupled to the display control panel 140.

The application processor 160 can execute an application to generate multimedia data, the application can be a movie player or a video game, and the multimedia data generated by executing the application can be images and sound effects relating to the application, such as the images and the sound of the movie, or the images and the sound of the video game. After the application processor 160 generates the application images of the multimedia data, the application processor 160 can control the display driver 120 to drive the display 110 for displaying the application images of the multimedia data.

In some embodiments of the present invention, the display 110 can support Video Graphics Array (VGA), High Definition Multimedia Interface (HDMI), or other types of video interface. According to the interface supported by the display 110, the display driver 120 can transmit the application images generated by the application processor 160 to the display 110 with the format required by the supporting interface so as to drive the display 110 to display the application images.

In some embodiments, the display driver 120 can be coupled to the display 110. Also, the display driver 120 and the application processor 160 can be disposed in the same case C1. Furthermore, the display driver 120 and the application processor 160 can be disposed on the same motherboard. In addition, the display driver 120 may not be a specific hardware device, and can be implemented by a general processor performing the corresponding driver program.

The desk 130 can be modeled as a common computer desk. The desk 130 has a surface for supporting the display 110, and perhaps also supporting the application processor 160 and its case C1.

The display control panel 140 can be disposed on the desk 130 where the user can easily reach for. In the present invention, the user can adjust the display characteristics of the display 110, such as brightness, color parameters and/or contrast, by using the display control panel 140 rapidly within reach, so the user does not need to quit the present application for making adjustment or leaving the seat to operate the buttons on the display 110 afar.

When the user operates the display control panel 140, for example, pressing the button on the display control panel 140, the display control panel 140 can output an initiation signal $SIG_{init}$. The input/output interface driver 150 has a plurality of input/output ports coupled to the display control panel 140. Therefore, the input/output interface driver 150 can receive the initiation signal $SIG_{init}$ and output a menu activation signal $SIG_{menu}$ according to the initiation signal $SIG_{init}$. In some embodiments of the present invention, the input/output interface driver 150 can be a general purpose input/output (GPIO) driver. In this case, the input/output interface driver 150 can be coupled to the switches of the buttons on the display control panel 140 through the input/output ports, and can be aware of the operation status of the display control panel 140, for example, whether any button is pressed, how many times the button is pressed, how long the pressing duration is, and which button is pressed, by polling the input/output ports.

In some embodiments, the input/output interface driver 150 can be an inter-integrated circuit (I2C) driver. In this case, the display control panel 140 can store the operation status of the buttons in the corresponding registers, and the input/output interface driver 150 can read the operation status from the registers of the display control panel 140 by sending clock signals and the control signals to the display control panel 140 through the corresponding ports. In some embodiments, the input/output interface driver 150 may support a different type of input/output interface. In this case, the input/output interface driver 150 would be set up to read the operation status of the display control panel 140 with the corresponding signal format according to the interface used by the input/output interface driver 150.

Furthermore, the display control panel 140 may include a plurality of buttons. The types of the buttons can be resistance sensing touch buttons, capacitance sensing touch buttons, or mechanical buttons. Also, the input/output interface driver 150 can identify the pressed button according to the signals outputted from the display control panel 140. Therefore, when the button corresponding to a selection menu is pressed and the display control panel 140 outputs the initiation signal $SIG_{init}$, the input/output interface driver 150 may output the menu activation signal $SIG_{menu}$ accordingly. However, in some embodiments, the input/output interface driver 150 can also identify the initiation signal $SIG_{init}$ by checking whether it is the first signal presented during a whole predetermined period. If the signal outputted by the display control panel 140 is confirmed to be the first signal during the predetermined period, then the input/output interface driver 150 would determine the signal to be an initiation signal $SIG_{init}$ and would send the menu activation signal $SIG_{menu}$ accordingly. Otherwise, the input/output interface driver 150 may perform the operations corresponding to the functions of the buttons. In other embodiments, the input/output interface driver 150 may derive the operation status of the display control panel 150 with a different mechanism and determine whether to output the menu activation signal $SIG_{menu}$ or other control signals accordingly.

In some embodiments, the input/output interface driver 150 can be disposed in the case C1 as the application processor 160, and may even be disposed on the same motherboard as the application processor. In addition, the input/output interface driver 150 may not be a specific hardware device, and may be a general processor performing the corresponding driver program.

When the application processor 160 receives the menu activation signal $SIG_{menu}$, the processor 160 can control the display driver 120 to drive the display 110 to present the menu image. The menu image can show the adjustment options available for the user, such as the display modes of the display 110, the brightness of the display 110, and even the parameters of other output devices, such as the volume of the audio card.

The user may select a specific option in the menu image by operating the display control panel 140. For example, the menu image may further include a cursor, and the display control panel 140 may include buttons for controlling the cursor and buttons for confirming the selection. Consequently, the user can move the cursor with the display control panel 140, and select the specific option by pressing the confirmation button when the cursor has been moved on the desired option. In this case, the display control panel 140 can output the control signal $SIG_{ctrl}$ to indicate the user has selected the specific option in the menu image.

The input/output interface driver 150 can output the menu control signal $SIG_{sel}$ according to the control signal $SIG_{ctrl}$, and the application processor 160 can output the display control signal $SIG_{dctrl}$ to the display driver 120 to have the display driver 120 adjust the display characteristic of the display 110 corresponding to the specific option according to the menu control signal $SIG_{sel}$.

In some embodiments of the present invention, the specific option selected by the user may correspond to a movie mode. In this case, the user may use the multimedia operation system 100 to play a movie, and the application images generated by the application processor 160 may be the images of the movie. When the user selects the movie mode, the application processor 160 can output the display control signal $SIG_{dctrl}$ to the display driver 120 to have the display driver 120 increase color contrast of the display 110 according to the menu control signal $SIG_{sel}$. Consequently, the colors shown in the movie images can be presented even more vividly.

In some embodiments of the present invention, the specific option selected by the user may correspond to a video game mode. In this case, the user may use the multimedia operation system 100 to play a video game, and the application images generated by the application processor 160 may be the images of the video game. When the user selects the video game mode, the application processor 160 can output the display control signal $SIG_{dctrl}$ to the display driver 120 according to the menu control signal $SIG_{sel}$ so the display driver 120 can increase the brightness of a dark region in the application image. That is, when the user selects the video game mode, the application processor 160 can increase the brightness of the dark region in the image of the video game with the display driver 120. Consequently, the user can easily see the enemies, the buildings, or the objects in the dark regions in the image of the video game, helping the user to play the game.

In some embodiments of the present invention, the specific option selected by the user may correspond to a brightness adjustment option. In this case, the application processor 160 can output the display control signal $SIG_{dctrl}$ to the display driver 120 to have the display driver 120 adjust the brightness of the display 110 according to the menu control signal $SIG_{sel}$. For example, the brightness adjustment option may mean to increase the brightness. In this case, the application processor 160 can output the display control signal $SIG_{dctrl}$ to the display driver 120 to have the display driver 120 increase the brightness of the display 110.

In addition, in some embodiments, the display driver 120 can be coupled to the display 110 through an external transmission line L1, and the display driver 120 can output control instructions through the display data channel command interface (DDC/CI) of the transmission line L1 to the display 110 to adjust the characteristic of the display 110 corresponding to the specific option according to the display control signal $SIG_{dctrl}$. Also, according to the video interface supported by the display 110, the transmission line L1 may support video graphics array (VGA) or high definition multimedia interface (HDMI).

In other words, when the user selects the specific option, the application processor 160 can output the display control signal $SIG_{dctrl}$ to the display driver 120 according to the corresponding function of the specific option. The display driver 120 can encode the display control signal $SIG_{dctrl}$ to meet the instruction format supported by the display 110, and transmit the encoded instruction through the display data channel command interface of the transmission line L1 to the display 110 to drive the display 110. Since the display data channel command interface is designed for transmitting instructions, the multimedia operation system 100 can allow the user to control the display 110 more conveniently without using additional transmission interface or installing additional decoding module in the display 110.

Furthermore, when the application processor 160 executes the application, the application processor 160 can select the menu image according to the graphic application programming interface (API) used by the application. For example, when the application processor 160 executes the video game application, the graphic API, Open GL or directX, may be used to present the video game images. Since different APIs may have different parameter settings for the images to be displayed, and may have different three dimensional coordination systems, the menu image may not be presented normally by the display 110 if the application running by the application 160 uses directX as it graphic API while the application processor 160 uses the menu image designed for Open GL directly.

In some embodiments, the application processor 160 can store a plurality of menu images, and the application processor 160 can select the menu image from the plurality of menu images according to the graphic API used by the application when receiving the menu activation signal $SIG_{menu}$. Consequently, the issue that the display 110 fails to display the menu image normally due to the mismatch between the menu image and the application can be solved.

Figure 2:
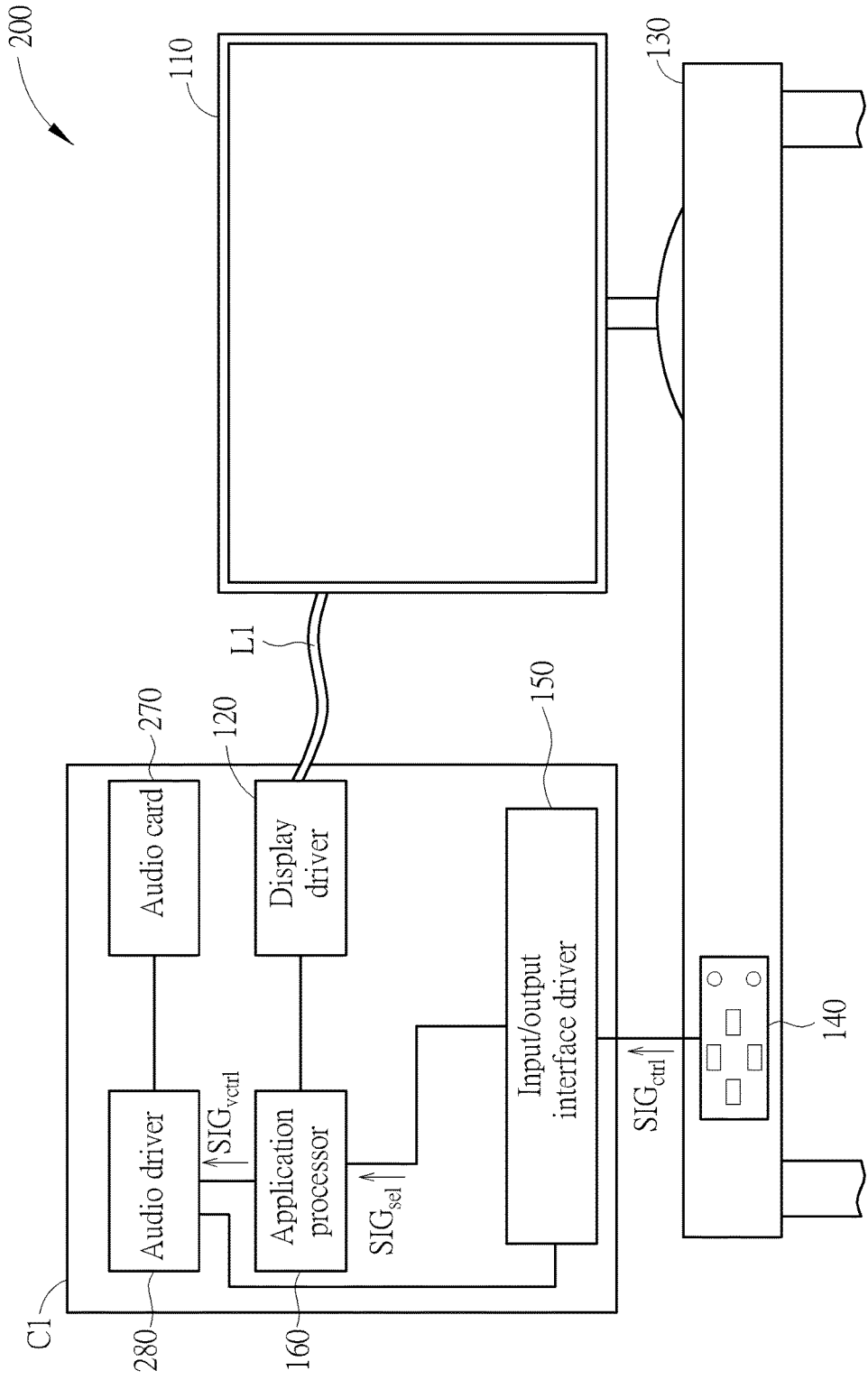
FIG. 2 shows a multimedia operation system according to another embodiment of the present invention.

FIG. 2 shows a multimedia operation system 200 according to another embodiment of the present invention. The multimedia operation system 200 and the multimedia operation system 100 have similar structures, and can be operated with similar principles. The main difference between these two is in that the multimedia operation system 200 not only includes the display 110, the display driver 120, the desk 130, the display control panel 140, the input/output interface driver 150, and the application processor 160, but also includes an audio card 270 and an audio driver 280.

The audio driver 280 is coupled to the audio card 270 and the application processor 160. The audio driver 280 can drive the audio card 270 to output application sound of the multimedia data generated by the application processor 160. In some embodiments, the audio card 270 and the audio driver 280 can be disposed in the case C1 as the application processor 160, and can be even disposed on the same motherboard as the application processor 160. However, in some other embodiments of the present invention, the audio card 270 can also be externally plugged to the case C1, and the audio driver 280 is not limited to a specific hardware device, but can be a general processor performing the corresponding driver program.

In FIG. 2, the user can still use the display control panel 140 to activate the menu image, and can further use the display control panel 140 to select the options shown in the menu image to control the audio characteristic of the audio card 270.

In other words, the display control panel 140 can output the control signal $SIG_{ctrl}$ to select a specific option in the menu image according to the user's operation. In this case, the input/output interface driver 150 can output the menu control signal $SIG_{sel}$ according to the control signal $SIG_{ctrl}$, and the application processor 160 can output the audio card control signal $SIG_{vctrl}$ to the audio driver 280 to have the audio driver 280 adjust the audio characteristic of the audio card 270 according to the menu control signal $SIG_{sel}$.

For example, if the specific option selected by the user is corresponding to the volume adjustment option, such as to increase the volume, then the application processor 160 can output the audio card control signal $SIG_{vctrl}$ to the audio driver 280 to have the audio driver 280 increase the volume of the audio card 270 according to the menu control signal $SIG_{sel}$. Also, the volume adjustment option can also mean to decrease the volume. In this case, the application processor 160 can output the audio card control signal $SIG_{vctrl}$ to the audio driver 280, and have the audio driver 280 decrease the volume of the audio card 270.

Furthermore, since the control of volume is rather simple, the multimedia operation system may also include a volume control panel installed on the desk, allowing the user to control volume even easier.

Figure 3:
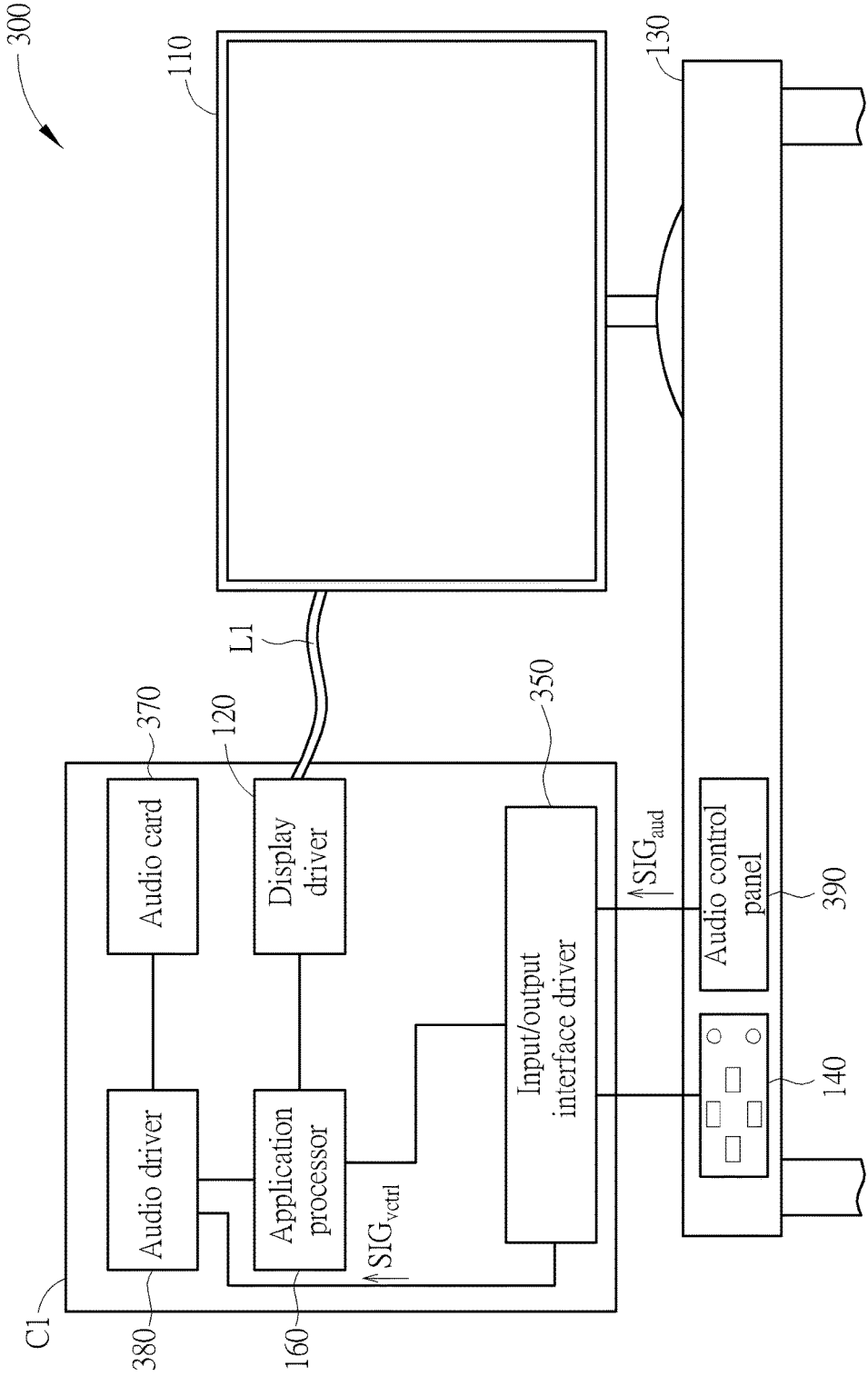
FIG. 3 shows a multimedia operation system according to another embodiment of the present invention.

FIG. 3 shows a multimedia operation system 300 according to another embodiment of the present invention. The multimedia operation system 300 and the multimedia operation system 100 have similar structures, and can be operated with similar principles. The main difference between these two is in that the multimedia operation system 300 not only includes the display 110, the display driver 120, the desk 130, the display control panel 140, the input/output interface driver 350, and the application processor 160, but also includes an audio card 370, an audio driver 380 and a volume control panel 390.

The audio driver 380 is coupled to the audio card 370, the application processor 160 and the input/output interface driver 350. The audio driver 380 can drive the audio card 370 to output the application sound of the multimedia data generated by the application processor 160. The volume control panel 390 is disposed on the desk 130, and is coupled to the input/output interface driver 350. In some embodiments, the volume control panel 390 can be disposed close to the display control panel 140 on the desk 130, or can be disposed away from the display control panel 140.

The volume control panel 390 can output a volume adjustment signal $SIG_{aud}$ according to the user's operation. The input/output interface driver 350 can receive the volume adjustment signal $SIG_{aud}$ and output an audio card control signal $SIG_{vctrl}$ to the audio driver 380, so the audio driver 380 can adjust the volume of the audio card 370 according to the volume adjustment signal $SIG_{aud}$, for example, to increase the volume of the audio card 370. Consequently, when the user uses the volume control panel 390 to adjust the volume of the multimedia operation system 300, the multimedia operation system 300 does not have to activate the menu image while the input/output interface driver 350 can output the audio card control signal $SIG_{vctrl}$ to the audio driver 380 to adjust the volume of the audio card 370. Therefore, the computation burden of the application processor 160 can also be reduced.

In summary, the multimedia operation system provided by the embodiments of the present invention can dispose the control panels on the desk, so the user can use the control panels to instantly adjust the characteristics of the output devices, such as the display and the audio card, within reach. That is, the multimedia operation system does not need to withdraw the present application to make the adjustment, and the user does not need to operate the buttons on the output devices far from their reach, allowing the user to control the multimedia operation system even more conveniently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multimedia operation system comprising:
a desk;
a display disposed on the desk;
a display driver coupled to the display and configured to drive the display to display images;
a display control panel installed on the desk, the display control panel comprising a plurality of buttons, and configured to output an initiation signal according to a user's operation;
an input/output interface driver comprising a plurality of input/output ports coupled to the display control panel, and configured to receive the initiation signal and output a menu activation signal according to the initiation signal; and
an application processor coupled to the input/output interface driver and the display driver, and configured to store a plurality of menu images, execute an application to generate multimedia data, control the display driver to drive the display for displaying an application image of the multimedia data, and control the display driver to drive the display for displaying a menu image selected from the plurality of menu images according to a graphic application programming interface used by the application when receiving the menu activation signal;
wherein the menu image is normally displayed on the display after the menu image is matched with the graphic application programming interface.

2. The multimedia operation system of claim 1, wherein:
the display control panel is further configured to output a control signal to select a specific option in the menu image according to a user's operation;
the input/output interface driver is further configured to output a menu control signal according to the control signal; and
the application processor outputs a display control signal to the display driver to have the display driver adjust a display characteristic of the display corresponding to the specific option according to the menu control signal.

3. The multimedia operation system of claim 2, wherein:
the specific option is corresponding to a movie mode; and
the application processor outputs the display control signal to the display driver to have the display driver increase color contrast of the display according to the menu control signal.

4. The multimedia operation system of claim 2, wherein:
the specific option is corresponding to a video game mode; and
the application processor outputs the display control signal to the display driver to have the display driver increase brightness of a dark region in the application image according to the menu control signal.

5. The multimedia operation system of claim 2, wherein:
the specific option is corresponding to a brightness adjustment option; and
the application processor outputs the display control signal to the display driver to have the display driver adjust brightness of the display according to the menu control signal.

6. The multimedia operation system of claim 2, wherein:
the display driver is coupled to the display through a transmission line; and
the display driver outputs control instructions through a display data channel command interface (DDC/CI) of the transmission line to the display to adjust the characteristic of the display corresponding to the specific option according to the display control signal.

7. The multimedia operation system of claim 1, wherein the display control panel is installed on the desk accessible by a user.

8. The multimedia operation system of claim 1, further comprising:
an audio card; and
an audio driver coupled to the audio card and the application processor, and configured to drive the audio card to output application sound of the multimedia data;
wherein:
the display control panel is further configured to output a control signal to select a specific option in the menu image according a user's operation;
the input/output interface driver is further configured to output a menu control signal according to the control signal; and
the application processor outputs an audio card control signal to the audio driver to have the audio driver adjust an audio characteristic of the audio card corresponding to the specific option according to the menu control signal.

9. The multimedia operation system of claim 8, wherein:
the specific option is corresponding to a volume adjustment option; and
the application processor outputs the audio card control signal to the audio driver to have the audio driver adjust a volume of the audio card according to the menu control signal.

10. The multimedia operation system of claim 1, further comprising:
an audio card;
an audio driver coupled to the audio card, the application processor, and the input/output interface driver, and configured to drive the audio card to output application sound of the multimedia data; and
a volume control panel, installed on the desk, and coupled to the input/output interface driver, the volume control panel being configured to output a volume adjustment signal according to a user's operation;
wherein the input/output interface driver is further configured to receive the volume adjustment signal and output an audio card control signal to the audio driver to have the audio driver adjust a volume of the audio card according to the volume adjustment signal.

11. The multimedia operation system of claim 1, wherein the input/output interface driver is a general purpose input/output (GPIO) driver.

12. A multimedia operation system comprising:
a desk;
a display disposed on the desk, and configured to display a menu image of multimedia data, wherein the menu image is selected from a plurality of menu images according to a graphic application programming interface used by an application;
a display driver coupled to the display through a transmission line;
a display control panel installed on the desk, the display control panel comprising a plurality of buttons, and configured to output a first control signal to select a specific option in the menu image according to a user's operation when the display displays the menu image;
an input/output interface driver comprising a plurality of input/output ports coupled to the display control panel, and configured to receive the first control signal and output a menu control signal according to the first control signal; and
an application processor coupled to the input/output interface driver, and configured to store the plurality of menu images, execute the application to generate the multimedia data, and output a display control signal to the display driver to have the display driver adjust a display characteristic of the display corresponding to the specific option according to the menu control signal;
wherein the display driver outputs control instructions through a display data channel command interface (DDC/CI) of the transmission line to the display to adjust the display characteristic of the display corresponding to the specific option according to the display control signal, and the menu image is normally displayed on the display after the menu image is matched with the graphic application programming interface.

13. The multimedia operation system of claim 12, wherein:
the specific option is corresponding to a movie mode; and
the application processor outputs the display control signal to the display driver to have the display driver increase color contrast of the display according to the menu control signal.

14. The multimedia operation system of claim 12, wherein:
the specific option is corresponding to a video game mode; and
the application processor outputs the display control signal to the display driver to have the display driver increase brightness of a dark region in the application image according to the menu control signal.

15. The multimedia operation system of claim 12, wherein:
the specific option is corresponding to a brightness adjustment option; and
the application processor outputs the display control signal to the display driver to have the display driver adjust brightness of the display according to the menu control signal.

16. The multimedia operation system of claim 12, further comprising:
an audio card; and
an audio driver coupled to the audio card and the application processor, and configured to drive the audio card to output application sound of the multimedia data;
wherein:
the display control panel is further configured to output a second control signal to select an audio adjustment option in the menu image;
the input/output interface driver is further configured to output an audio control signal according to the second control signal; and
the application processor outputs an audio card control signal to the audio driver to have the audio driver adjust an audio characteristic of the audio card corresponding to the specific option according to the audio control signal.

17. The multimedia operation system of claim 16, wherein:
the specific option is corresponding to a volume adjustment option; and
the application processor outputs the audio card control signal to the audio driver to have the audio driver adjust a volume of the audio card according to the audio control signal.

18. The multimedia operation system of claim 12, further comprising:
an audio card;
an audio driver coupled to the audio card, the application processor, and the input/output interface driver, and configured to drive the audio card to output application sound of the multimedia data; and
a volume control panel, installed on the desk, and coupled to the input/output interface driver, the volume control panel being configured to output a volume adjustment signal according to a user's operation;
wherein:
the input/output interface driver is further configured to receive the volume adjustment signal and output an audio card control signal to the audio driver according to the volume adjustment signal; and the audio driver is further configured to adjust a volume of the audio card according to the audio card control signal.

19. The multimedia operation system of claim 12, wherein the input/output interface driver is a general purpose input/output (GPIO) driver.

* * * * *